Aug. 14, 1956 — C. W. LEVY — 2,758,393
REMEDIAL READING APPARATUS
Filed Nov. 17, 1954 — 3 Sheets-Sheet 2

INVENTOR
Charles W. Levy
ATTORNEYS

INVENTOR
Charles W. Levy

ATTORNEYS

United States Patent Office 2,758,393
Patented Aug. 14, 1956

2,758,393

REMEDIAL READING APPARATUS

Charles W. Levy, Alexandria, Va.

Application November 17, 1954, Serial No. 469,379

26 Claims. (Cl. 35—35)

This invention relates to education and more particularly to an apparatus which may be utilized as an adjunct to remedial reading instruction and which may serve as an automatic training means for increasing the reading speed of the student.

Heretofore, several different types of remedial reading apparatus have been utilized but these are relatively expensive thus limiting their availability and also these prior art machines have not been particularly satisfactory for the purpose intended. Certain of these are merely a mechanical adaptation of the flash card system of teaching reading in which printed material is projected onto a screen or otherwise made visible for a pre-determined period of time with the student viewing this material and attempting to assimilate the same during visibility thereof. This is contrary to normal or natural reading procedures and consequently, an apparatus which will promote and increase reading speed in a normal line by line and left to right manner and which machine may be of relatively inexpensive construction represents a very worthwhile step forward in the art.

It is accordingly an object of this invention to provide a remedial reading apparatus in which a book containing printed material may be read line by line and from left to right at a pre-determined speed.

A further object of the invention is the provision of a remedial reading apparatus in which the speed of reading may be progressively increased as required by the progress of the student.

A still further object of the invention is the provision of a remedial reading apparatus which may utilize conventional printed material as appearing in a book thereby eliminating the necessity for providing specially printed or otherwise prepared material.

Another object of the invention is the provision of a remedial reading apparatus in which a line of printing may be read from left to right in zones or blocks and in which the eyes of the student are automatically induced to fix at the center of each zone and to move from one zone to the next.

A further object of the invention is the provision of a remedial reading apparatus which may be electrically driven and illuminated and in which the only manual operations required are for shifting the reading material line by line and from page to page.

A still further object of the invention is the provision of a remedial reading apparatus of convenient size and relatively economical construction thereby making such apparatus available to individuals and institutions of modest means.

Another object of the invention is the provision of a rotary disk for use in a remedial reading apparatus of the character described and including means for selectively providing from one to four fixations per line of reading.

Further objects and advantages of the invention will be apparent from the following description taken in conjunction with the accompanying drawings wherein.

With continued reference to the drawing there is shown a remedial reading apparatus constructed in accordance with this invention and which may well comprise a base 10 of generally rectangular elongated formation, the base 10 being provided with spaced parallel trackways 11 extending substantially throughout the length thereof. The function of such trackways will be later described.

Figures 1, 6:
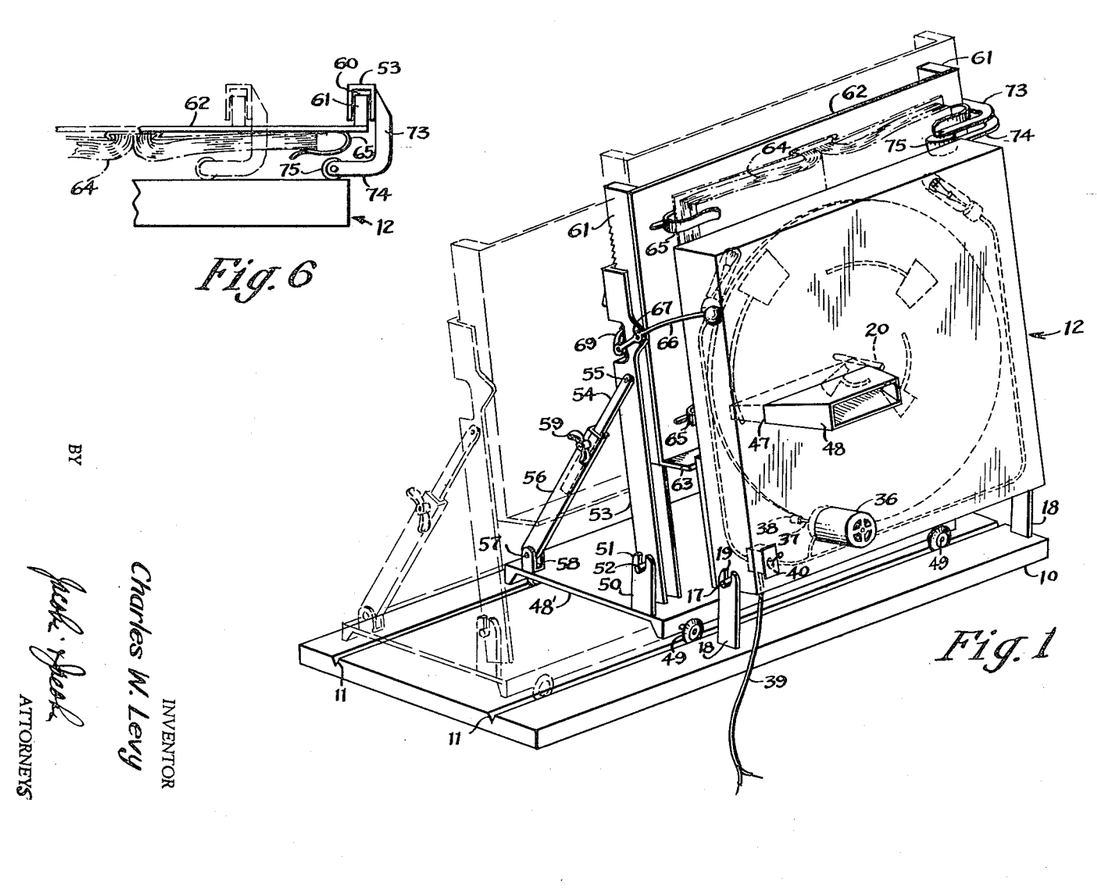
Fig. 1 is a view in perspective showing a remedial reading apparatus constructed in accordance with this invention.
Fig. 6, a fragmentary top plan view showing the means for maintaining the book supporting frame and housing in spaced parallel relationship.
Figures 2, 3, 4, 5:
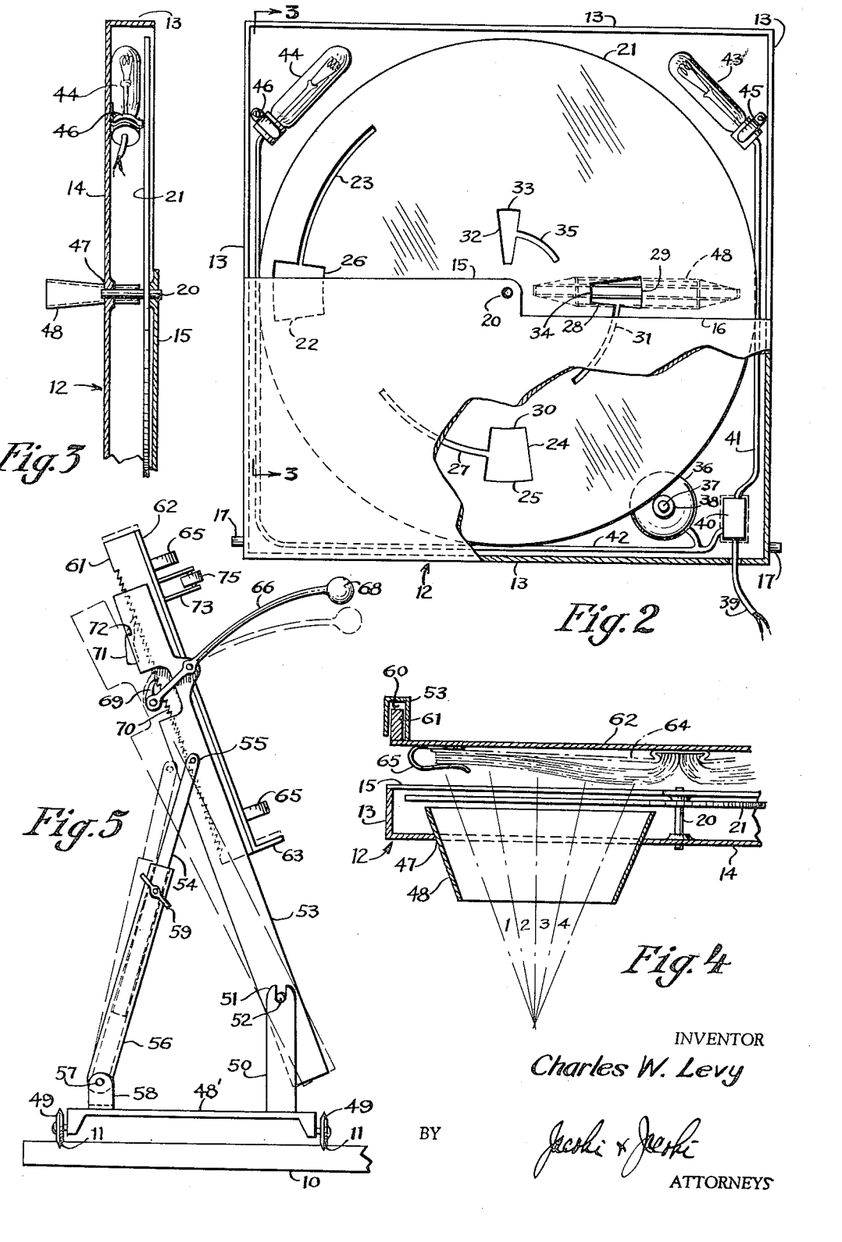
Fig. 2, a vertical sectional view through a portion of the apparatus as shown in Fig. 1.
Fig. 3, a fragmentary sectional view taken on the line 3—3 of Fig. 2.
Fig. 4, a fragmentary horizontal sectional view of a portion of the apparatus and showing the relationship between the reading material, the viewing hood and the eye of the student.
Fig. 5, a side elevational view of the book supporting frame and carriage utilized in conjunction with the apparatus of this invention.

A generally rectangular housing 12 formed by sidewalls 13, a front wall 14 and a partial rear wall 15, the rear wall 15 extending from the lower sidewall 13 to a point slightly above the center of the housing 12 and being provided with a cutout portion 16 at one side thereof, as clearly shown in Fig. 2, the purpose of which will be later described. The housing 12 is provided with trunnions 17 projecting from opposed sidewalls 13 and such trunnions are pivotally mounted in upstanding posts 18 secured to the base 10, the posts 18 being provided with slots 19 in the upper ends thereof to permit convenient removal and insertion of the trunnions 17 therein. As shown in Fig. 1, the housing 12 extends upwardly above the base 10 and may be moved forwardly and rearwardly on the trunnions 17 to any desired angle of inclination.

Rotatably mounted within the housing 12 on an axle 20 is a disk 21 of relatively thin, opaque or translucent material, such as metal, glass or a suitable plastic the axle 20 being supported in the front wall 14 and the rear wall 15. Disk 21 is provided with a first trapezoidal shaped aperture 22 located slightly inside the outer circumference of the disk 21 and communicating with the aperture 22 is an arcuate slot 23 which has a length approximately three times the width of the aperture 22. A second trapezoidal shaped aperture 24 is provided in the disk 21 with the outer edge 25 thereof in substantially arcuate alignment with the inner edge 26 of the aperture 22. Communicating with the aperture 24 is an arcuate slot 27 having a length substantially three times the width of the slot 24. A third trapezoidal shaped aperture 28 is provided in the disk with the outer edge 29 thereof substantially in arcuate alignment with the inner edge 30 of the aperture 24. Communicating with the aperture 28 is an arcuate slot 31 having a length approximately three times the width of the aperture 28. A fourth trapezoidal shaped aperture 32 is provided in the disk with the outer edge 33 thereof substantially in arcuate alignment with the inner edge 34 of the aperture 28. Communicating with the aperture 32 is an arcuate slot 35 having a length approximately three times the width of the aperture 32.

It will be noted, that the width of the apertures 22, 24, 28 and 32 progressively decreases from the first to the fourth aperture and that the lengths of the arcuate slots 23, 27, 31, and 35 also progressively decrease in accordance with the decreasing width of the associated apertures. The width of the apertures has been so proportioned that for a given speed of rotation of the disk 21, each aperture will pass a given point in substantially the same period of time, even though such apertures are spaced from a point near the circumference of the disk 21 to a point near the center thereof. The same situation obtains insofar as the arcuate slots are concerned, in that, these slots vary in length in accordance with the location on the disk and consequently, the time required for each slot to pass a given point will be substantially the same provided the speed of rotation of the disk 21 is maintained constant.

The disk 21 may be driven by a suitable electric motor 36 secured to the housing 12 in any suitable manner, the motor 36 being provided with a power output shaft 37 having a friction wheel 38 mounted thereon which may engage the periphery of the disk 21. Of course, the diameter of the friction wheel 38 will be so proportioned as to drive the wheel of the disk 21 at the required speed. Electric power may be supplied from a suitable source through a cable 39 connected to a control switch 40 which operates to control the motor 36 and the switch 40 may also be connected through cables 41 and 42 with suitable lamps 43 and 44 respectively, disposed in the upper part of the housing 12 and secured thereto by suitable clips or other means 45 and 46 respectively. It will, therefore, be seen that upon closing of the switch 40, the motor 36 will be energized to rotate the disk 21 and at the same time, the lamps 43 and 44 will be energized to provide illumination for a purpose to be later described.

The front wall 14 of the housing 12 is provided with an elongated, rectangular slot 47 horizontally disposed and extending along a radius of the disk 21 and in the slot 47 there is mounted a generally rectangular, tapered viewing hood 48. Hood 48 extends forwardly from the front wall 14 an appreciable distance and extends through such wall, as best shown in Figs. 3 and 4, to a point closely adjacent the front face of the disk 21. The viewing hood 48 is located substantially in alignment with the cutout portion 16 of the rear wall 15 and consequently, the rear wall 15 will not obstruct the vision of anyone looking through the viewing hood 48 from the front side thereof.

An elongated carriage is provided with wheels 49 which are received in the spaced parallel trackways 11 in the base 10 and serve to permit movement of carriage 48' from one end of the base 10 to the other. Upstanding posts 50 are mounted on the carriage 48' adjacent each end thereof and posts 50 are provided at their upper ends with slots 51 for pivotally receiving trunnions 52 extending from spaced substantially parallel guide bars 53 of channel cross-section. A brace member 54 is pivotally mounted at 55 on the guide bar 53 and brace member 54 is slidably received in a tubular brace member 56 which in turn is pivotally mounted at 57 on a bracket 58 secured to the carriage 48'. A clamping screw 59 may be threadedly received in the tubular brace member 56 to engage the brace member 54 to prevent relative movement between the same and brace member 56 thereby maintaining the guide bars 53 at any desired inclination.

Slidably mounted in the channels 60 of the guide bars 53 are side rails 61 connected by a sheet 62 of suitable material, the sheet 62 being provided at its lower edge with an angularly disposed shelf 63 for a purpose to be presently described. Side rails 61 and sheet 62 provide a vertically movable slide and a conventional book 64 may be positioned on this slide in opened condition with the lower edge of the book engaging the upper surface of the shelf 63 and with the leaves of the book held open by spring clips 65 extending forwardly from the sheet 62 adjacent the upper edge thereof. If necessary or desirable, additional spring clips 65 may be provided adjacent the lower edge of the sheet 62, slightly above the shelf 63, as shown in Fig. 1.

The mechanism just above described, provides a book supporting frame and in order that the book 64 may be moved upwardly step by step, the distance between printed lines therein, there may be provided a lever 66 pivotally mounted at 67 on one of the guide bars 53, the lever 66 being provided at one end with a finger engaging knob 68 and at the opposite end with a pivotally mounted pawl 69 so disposed as to engage ratchet teeth 70 provided in the rear edge of one of the side rails 61. In order to maintain the side rails 61 and the book 64 carried thereby in adjusted position, a pawl 71 may be pivotally mounted at 72 on the guide bar 53, the pawl 71 also serving to engage the ratchet teeth 70 and prevent downward movement of the side rails 61 and book 64 until complete upward movement thereof has been accomplished. Thereafter the pawl 71 may be released and the book and associated slide moved downwardly to starting position.

In order that the book supporting frame and the housing 12 may be maintained in substantially parallel spaced relationship, regardless of the angle of inclination of the frame and housing, there may be provided on one of the guide bars 53 a forwardly extending bracket 73 terminating in an angularly disposed portion 74 serving to rotatably mount a roller 75 which, as shown in Figs. 1 and 6, will engage the rear upper edge of the housing 12 and maintain the same in spaced parallel relation to the hook supporting frame, regardless of the position of the carriage 48 on the base 10.

The remedial reading apparatus, above described, is intended to be utilized to increase the reading speed of a person and the structure is such that a conventional book may be utilized as reading subject matter, thereby making unnecessary the provision of specially prepared subject matter and, as stated above, the book 64 is opened to the desired pages and positioned on the shelf 63 with the pages and book held in opened condition by the clips 65. It is presumed that the book would be lowered to a point where the top line on the left hand page would be disposed directly rearwardly of the slot 47 in the front wall 14 of the housing 12 and therefore, such line of printing would be visible through the viewing hood 48 provided the disk 21 did not intervene. It has been found that for practice in increasing reading speed, it is desirable that the subject matter to be observed be visible for approximately one hundredth of a second and consequently, the width of the trapezoidal apertures 22, 24, 28 and 32 in the disk 21 and the speed of rotation of the disk 21 are so proportioned that it requires one hundredth of a second for each aperture to pass the slot 47 and the viewing hood 48.

As above described, four trapezoidal apertures are provided in the disk 21 and the lengths of these apertures are such that each line of printing on the book 64 will be divided into quarters, or in other words, during one revolutions of the disk 21, the entire line of printing will be exposed progressively through the four trapezoidal shaped apertures.

It has also been found that it is highly desirable for the eyes of the student to be fixed substantially at the center of each trapezoidal aperture prior to such aperture reaching the viewing hood 48 to expose a portion of the line of printing and consequently, the arcuate slots 23, 27, 31 and 35 have been provided and the length of these slots is so proportioned as to provide a line of light leading the opening of each trapezoidal aperture by approximately three one hundredths of a second.

In operation it is assumed that the book 64 is properly positioned whereupon the switch 40 is closed to energize the motor 36 and the lamps 43 and 44, whereupon the disk 21 starts to revolve at a pre-determined speed and the slot 23 leading to the first aperture 22 will become visible through the viewing hood 48 thus fixing the eyes substantially at the center of aperture 22. Upon aperture 22 reaching a position directly to the rear of the viewing hood 48, the first quarter of the line of printing on the book 64 will become visible for one hundredth of a second and during this time period the student is expected to read and understand one-quarter of the line of printing visible therethrough. Likewise, the second, third and fourth slots and apertures will progressively open making visible the remainder of the line of printing and as soon as the last aperture 32 has closed, the lever 66 is actuated to raise the book 64 one line, whereupon the next line may be read in the same manner. It is contemplated that a disk 21 provided with four trapezoidal apertures will be utilized until the student can readily absorb the printed material at the rate of reading speed afforded by this arrangement.

In order that the remedial reading apparatus of this invention may be utilized to further increase the reading speed of a student, it is contemplated that additional disks 21 will be provided, such disk having respectively three apertures and two apertures and such disks may be substituted for the disks in the machine in order to provide progressively increasing reading speeds by first breaking the printed line up into four sections, then three sections, then two sections. In all probability, two sections would be about the ultimate speed which might be expected from most students.

Figures 7, 8:
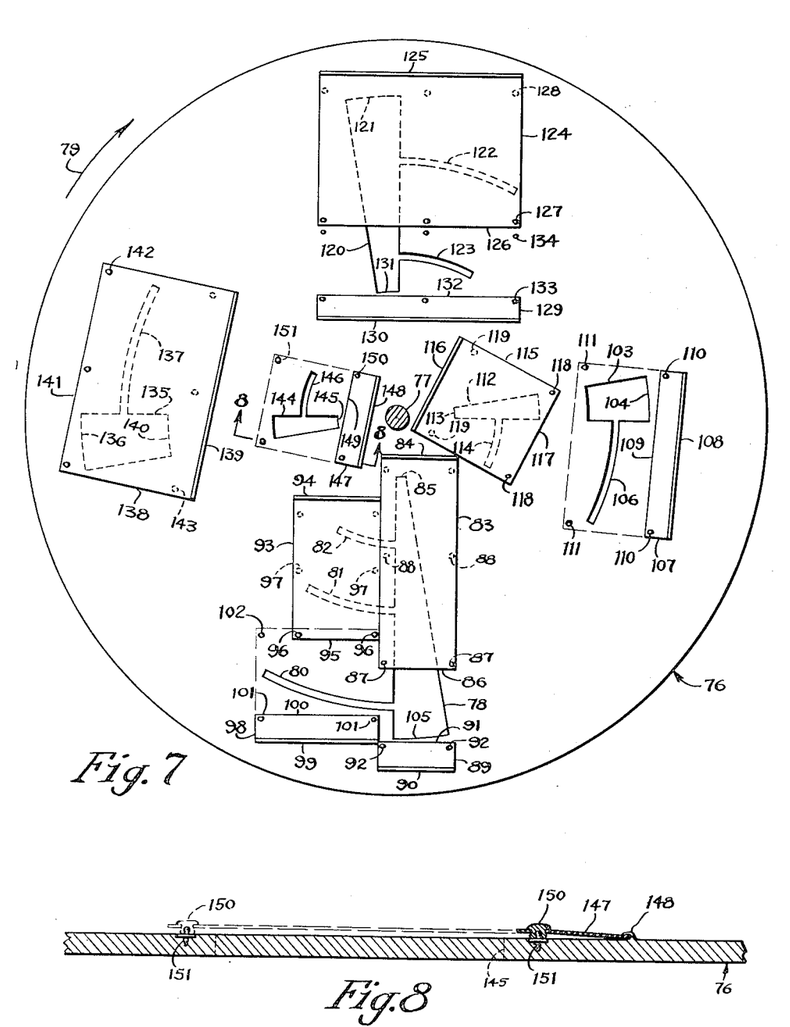
Fig. 7, a front elevational view of a modified form of rotary disk incorporating means for selectively providing from one to four fixations per line of reading.
Fig. 8, a fragmentary sectional view on the line 8—8 of Fig. 7.
Figure 9:
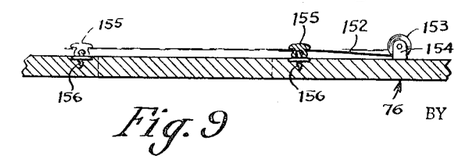
Fig. 9, a fragmentary sectional view similar to Fig. 8 and showing a modified shutter construction.

A modified form of rotary disk 76 is shown in Figs. 7, 8 and 9 and this disk 76 may be substituted for the disk 21 described above in connection with the remedial reading apparatus of this invention, which disk may, upon proper adjustment of the parts thereof, provide one, two, three or four apertures the use of which will permit from one to four fixations per line of reading. Use of this disk will therefore result in a universal remedial reading machine which will permit adjustment from minimum to maximum reading speed without the necessity of replacing one disk with another.

The disk 76 is provided with an axle 77 by which the same may be rotatably mounted in the housing of the remedial reading apparatus above described, and the disk 76 is provided with an elongated, trapezoidal shaped aperture 78 disposed on a radius and being of a length substantially equal to the length of the longest line of reading to be encountered on a book to be utilized in this apparatus. The disk 76 is designed to be rotated in the direction of the arrow 79 and on the leading side of the aperture 78 there is provided a plurality of spaced, arcuate slots 80, 81 and 82. The slots 80, 81 and 82 intersect or terminate in the aperture 78 and the length of each slot 80, 81 and 82 is approximately three times the width of the aperture 78 at the point of termination. These arcuate slots provide markers for fixing the eyes of the student at approximately the center of the aperture to be utilized in a manner to be presently described.

A shutter for the aperture 78 is provided in the form of a curtain 83 of elastic material, such as closely woven nylon or other suitable material, the inner end 84 of the curtain 83 being fixed to the disk 76 adjacent the inner end 85 of the aperture 78. The curtain 83 may be provided at its outer end 86 with snap fasteners 87 and complementary snap fasteners 88 may be provided on the disk 76 in order to permit positioning the end 86 of the curtain 83 at any desired location along the length of the aperture 78. As part of the shutter for the aperture 78, there is also provided a second curtain 89 of elastic material secured at its outer end 90 to the disk 76 and being provided at its inner end 91 with snap fasteners 92 which may engage the complementary snap fasteners 88 in the disk 76 to position the curtain 89 in any desired position over the aperture 78.

In order to close or open the arcuate slots 80, 81 and 82, there is provided a shutter therefor in the form of a curtain 93 of suitable elastic material secured at one end 94 to the disk 76, the opposite end 95 being provided with snap fasteners 96 which may engage complementary snap fasteners 97 provided in the disk 76 to permit positioning the curtain 93 over either the slot 82 or over both the slots 81 and 82. There is also provided a second curtain 98 secured at its outer end 99 to the disk 76 and being provided at its inner end 100 with snap fasteners 101 which may engage snap fasteners 97 and 102 in the disk 76 to enable the curtain 98 to cover the arcuate slot 80.

A second elongated aperture of trapezoidal shape 103 is provided in the disk 76 with the major dimension thereof disposed on a radius angularly spaced ninety degrees from the radius on which the aperture 78 is positioned and the length of aperture 103 is approximately one-quarter the length of aperture 78. The outer end 104 of the aperture 103 is spaced inwardly from the outer edge 105 of the aperture 78, a distance equal approximately one-quarter the length of the aperture 78. An arcuate slot 106 is provided in the disk 76 on the leading side of the aperture 103 and terminates in such aperture on the transverse center line thereof. The length of arcuate slot 106 is approximately three times the width of the aperture 103 at the longitudinal center line.

In order to selectively cover or uncover the aperture 103 and slot 106, there is provided a shutter in the form of a curtain 107 of suitable elastic material, one end 108 of the curtain 107 being secured to the disk 76 adjacent the outer end 104 of the aperture 103, the inner end 109 of the curtain 107 being provided with snap fasteners 110 which are adapted to engage complementary snap fasteners 111 in the disk 76 to secure the curtain 107 in place over the aperture 103 and arcuate slot 106.

A third elongated aperture 112 of trapezoidal shape is provided in the disk 76 and is disposed on the same radius as the aperture 103. The length of aperture 112 is approximately one-third the length of the aperture 78 and the inner end 113 of the aperture 112 is substantially in angular alignment with the inner end 85 of the aperture 78. There is also provided an arcuate slot 114 in the disk 76 terminating in the aperture 112 on the longitudinal center line thereof, the length of the slot 114 being approximately three times the width of the aperture 112 at the longitudinal center line.

In order to selectively cover the aperture 112 and slot 114 there is provided a shutter in the form of an curtain 115 of suitable elastic material secured at one end 116 to the disk 76 adjacent the inner end 113 of the aperture 112. The curtain 115 being provided at its opposite end 117 with snap fasteners 118 which are adapted to engage complementary snap fasteners in the disk 76 to secure the curtain 115 in place, as shown in Fig. 7, covering the aperture 112 and arcuate slot 114 or engaging the complementary snap fasteners 119 to uncover the aperture 112 and arcuate slot 114.

A fourth elongated aperture 120 of trapezoidal shape is provided in the disk 76 and is disposed on a radius angularly spaced 90 degrees from the radius containing the apertures 103 and 112. The outer end 121 of the aperture 120 is substantially in angular alignment with the outer end 105 of the aperture 78. Two spaced arcuate slots 122 and 123 are provided in the disk 76 on the leading side of the aperture 120 and terminate in such aperture with the length of the slots 122 and 123 being approximately three times the width of the aperture 120 at the point of termination.

In order to selectively cover a portion of the aperture 120 and the slot 122 there is provided a shutter in the form of a curtain 124 of suitable elastic material with one end 125 thereof secured to the disk 76 adjacent the outer end 121 of the aperture 120 and with the opposite end 126 of the curtain 124 provided with snap fasteners 127 which may selectively engage complementary snap fasteners 128 in the disk 76 to position the curtain 124 over a portion of the aperture 120 and the slot 122 or in a position to completely uncover the aperture 120 and the slot 122. There is also provided a second curtain 129 of suitable elastic material with the inner edge 130 thereof secured to the disk 76 adjacent the inner end 131 of the aperture 120, the opposite end 132 of the curtain 129 being provided with snap fasteners 133 adapted to engage complementary snap fasteners 134 in the disk 76 to selectively permit the curtain 129 to cover a portion of the aperture 120 and the slot 123.

A fifth elongated aperture 135 of trapezoidal shape is provided in the disk 76 with the major dimension disposed on a radius angularly spaced ninety degrees from the radius containing the aperture 120. The length of the aperture 135 is approximately one-third the length of the aperture 78 and the outer end 136 of the aperture 135 is in substantial angular alignment with the outer end 105 of the aperture 78. An arcuate slot 137 is provided in the disk 76 on the leading side of the aperture 135 and terminates therein with the length of the slot 137 being approximately three times the width of the aperure 135 at the point of termination.

In order to selectively cover or uncover the aperture 135 and slot 137, there is provided a shutter in the form of a curtain 138 of suitable elastic material with the inner end 139 of the curtain 138 being secured to the disk 76 adjacent the inner end 140 of the aperture 135 and with the opposite end 141 of the curtain 138 provided with snap fasteners 142 which may engage complementary snap fasteners 143 provided in the disk 76 to permit positioning the curtain 138 over the aperture 135 and the slot 137 or in a position to uncover the aperture 135 and slot 137.

A sixth elongated aperture 144 is provided in the disk 76 with the major dimension thereof disposed on the same radius as the aperture 135 and with the inner end 145 of the aperture 144 in substantially angular alignment with the inner end 85 of the aperture 78. The length of aperture 144 is approximately one-quarter the length of aperture 78. An arcuate slot 146 is provided in the disk 76 on the leading side of the aperture 144, the slot 146 terminating in the aperture 144 on the longitudinal center line thereof, and the length of the slot 146 is approximaely three times the width of the aperture 144 at the longitudinal center line.

In order to permit the selective covering or uncovering of the aperture 144 and slot 146, there is provided a shutter in the form of a curtain 147 of suitable elastic material with the inner end 148 thereof secured to the disk 76 adjacent the inner end 145 of the aperture 144, and with the opposite end 149 of the curtain 147 provided with snap fasteners 150 which may engage snap fasteners 151 in the disk 76 to secure the curtain 147 in position over the aperture 144 and slot 146.

As shown in Fig. 7, the disk is adjusted to utilize four apertures and provide minimum reading speed, and for this purpose, as shown, the curtain 83 is so positioned as to expose the outer quarter of aperture 78 and the curtain 93 is positioned to cover the arcuate slots 81 and 82, while the slot 80 remains uncovered. The curtain 107 is so positioned as to uncover the aperture 103 and slot 106 which provides the second aperture in the sequence and the curtain 115 is so positioned as to cover the aperture 112 and slot 114. The curtain 124 is positioned to cover the slot 122 and all but the inner portion of the aperture 120, which provides the third aperture in the sequence. The curtain 138 is positioned to cover the aperture 135 and slot 137 and the curtain 147 is positioned to uncover the aperture 144 and slot 146 which provides the fourth aperture in the sequence.

When it is desired to utilize three apertures, the curtain 138 is positioned to expose the aperture 135 and slot 137 and the curtains 83, 89, 93 and 98 are positioned to uncover the center third of the aperture 78 and the slot 81 which provides the second aperture in the sequence. The third aperture in the sequence is provided by aperture 112 and, of course, the curtain 115 is so positioned as to uncover this aperture.

When it is desired to utilize two apertures, the curtain 124 is so positioned as to expose the outer portion of aperture 120 and slot 122 and the curtain 129 is positioned to cover the inner portion of the aperture 120 and slot 123. The second aperture in the sequence is provided by positioning the curtain 89 to cover the outer portion of the aperture 78 and the curtain 98 to cover the slots 80 and 81, leaving slot 82 and the inner portion of aperture 78 uncovered.

When it is desired to utilize only a single aperture, all apertures except aperture 78 are covered and slots 80 and 82 are covered by curtains 98 and 93 respectively.

There will be seen that by the above explanation, it is possible to so adjust all of the curtains provided on the disk 76 as to provide any desired combination of apertures and slots whereby a line of printing may be read in any desired manner from one to four fixations per line.

A modified form of curtain for the shutters is shown in Fig. 9, and this may well comprise a curtain 152 of any suitable material which is sufficiently opaque for the purpose intended, this curtain 152 being received on a roll 153 rotatably mounted on brackets 154 secured to the disk 76, there being provided suitable means, not shown, for rotating the roll 153 to retract the curtain 152. This means may, if desired, be in the form of a coil spring much in the same manner as the conventional window shade roller utilized on the windows of a building. The opposite end of the curtain 152 is provided with snap fasteners 155 which may selectively engage complementary snap fasteners 156 secured to the disk 76 to position the curtain 152 in a suitable location over the associated apertures or slots. Of course, if desired, any other suitable means may be substituted for the snap fasteners 155 and 156 and also for the snap fasteners described above in connection with the other form of the invention which will suitably maintain the curtains in the desired extended or retracted position.

It will be seen that by the above described forms of the invention there has been provided a universal rotary disk which may be utilized to provide any desired combination of apertures and slots and thus a remedial reading apparatus is provided which is universal in character and which may be utilized with both beginners and advanced students and provide reading speeds from approximately two hundred and fifty words per minute to one thousands words per minute.

After the left hand page of the book 64 has been read, the book will be lowered to starting position by releasing the pawl 71 and the carriage 48' carrying the book 64 moved toward the left to the position shown in phantom in Fig. 1, whereupon the right hand page of the book 64 is positioned immediately rearwardly of the viewing hood 48 and the reading exercise is repeated in the manner described above.

It will thus be seen that by the above described invention there has been provided a remedial reading apparatus which may be conveniently and economically constructed from readily available material and in which a great majority of the parts may be fabricated by relatively inexpensive stamping operations and in which precision machine work is reduced to a minimum. The apparatus is extremely simple to operate and will require substantially no maintenance and will likewise operate to materially increase the reading speed of students utilizing the same. Conventional books may be utilized for reading material and after completing the two opposite pages of the book 64, the page may be conveniently turned by tilting the housing 12 forwardly on the trunnion 17 and turning the page after which the housing 12 is moved rearwardly into engagement with the roller 75 which maintains the housing 12 in spaced substantially parallel alignment with the pages of the book 64. As described above, the apparatus may be conveniently adjusted to provide different or increased reading speeds as the student progresses and the apparatus is of such size and weight as to be readily portable.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A remedial reading apparatus comprising an elongated base, a generally rectangular housing extending above said base and hingedly mounted thereon toward one end, said housing comprising sidewalls, a front wall and a partial rear wall closing the lower part of said housing, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced ninety degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced ninety degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced ninety degrees from said third mentioned radius and with the outer edge in arcuate alignment with the inner edge of said third aperture, a fourth arcuate slot in said disk terminating in said fourth aperture at the transverse center line, the length of each slot being approximately three times the width of the associated aperture, a horizontal slot in said front wall on one side of the center line of said disk and disposed on a radius thereof, a viewing hood extending through said slot and terminating adjacent the front face of said disk, means for rotating said disk at a pre-determined speed, a carriage mounted on said base rearwardly of said housing for movement longitudinally of said base, a book supporting frame, hingedly mounted on said carriage, means for maintaining said frame at a desired angle of inclination, a vertically movable slide mounted on said frame, means for retaining an open book on said slide, means for moving said slide upwardly step by step, the distance between printed lines in said book, means for releasably retaining said slide in adjusted position with a printed line in alignment with said hood, means on said frame for engaging said housing to maintain said housing in spaced substantially parallel relation to said slide and a light source in the upper portion of said housing for illuminating the open face of said book whereby upon rotation of said disk a line of printing on one page of said book will be progressively visible in a series of exposures through said apertures from left to right, each exposure being of the same duration, and upon completion of one page said carriage may be moved on said base to bring the opposite page into alignment with said hood, said arcuate slots serving to fix the eyes of the viewer at the center of each aperture.

2. Remedial reading apparatus comprising an elongated base, a generally rectangular housing extending above said base and hingedly mounted thereon toward one end, said housing comprising sidewalls, a front wall and a partial rear wall closing the lower part of said housing, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a horizontal slot in said front wall on one side of the center of said disk and disposed on a radius thereof, a viewing hood extending through said slot and terminating adjacent the front face of said disk, means for rotating said disk at a pre-determined speed, a carriage mounted on said base rearwardly of said housing for movement longitudinally of said base, a book supporting frame hingedly mounted on said carriage, means for maintaining said frame at a desired angle of inclination, a vertically movable slide mounted on said frame, means for retaining an open book on said slide, means for moving said slide upwardly step by step the distance between printed lines in said book, means for releasably retaining said slide in adjusted position with a printed line in alignment with said hood, means on said frame for engaging said housing to maintain said housing in spaced substantially parallel relation to said slide and a light source in the upper portion of said housing for illuminating the open face of said book whereby upon rotation of said disk a line of printing on one page of said book will be progressively visible in a series of exposures through said apertures from left to right, each exposure being of the same duration, and upon completion of one page said carriage may be moved on said base to bring the opposite page into alignment with said hood, said arcuate slots serving to fix the eyes of the viewer at the center of each aperture.

3. Remedial reading apparatus comprising an elongated base, a generally rectangular housing extending above said base and hingedly mounted thereon toward one end, said housing comprising sidewalls, a front wall and a partial rear wall closing the lower part of said housing, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at transverse center line, a viewing hood extending through said front wall on a radius of said disk, means for rotating said disk at a pre-determined speed, a carriage mounted on said base rearwardly of said housing for movement longitudinally of said base, a book supporting frame hingedly mounted on said carriage, means for maintaining said frame at a desired angle of inclination, a vertically movable slide mounted on said frame, means for retaining an open book on said slide, means for moving said slide upwardly, step by step the distance between printed lines in said book, means for releasably retaining said slide in adjusted position with a printed line in alignment with said hood, means on said frame for engaging said housing to maintain said housing in spaced substantially parallel relation to said slide and a light source for illuminating the open face of said book whereby upon rotation of said disk a line of printing on one page of said book will be progressively visible in a series of exposures through said apertures from left to right, each exposure being of the same duration, and upon completion of one page said carriage may be moved on said base to bring the opposite page into alignment with said hood, said arcuate slots serving to fix the eyes of the viewer at the center of each aperture.

4. Remedial reading apparatus comprising a base, a housing extending above said base and hingedly mounted thereon, said housing comprising sidewalls, a front wall and a partial rear wall closing the lower part of said housing, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a predetermined speed, a carriage mounted on said base rearwardly of said housing for movement longitudinally of said base, a book supporting frame hingedly mounted on said carriage, means for maintaining said frame at a desired angle of inclination, a vertically movable slide mounted on said frame, means for retaining an open book on said slide, means for moving said slide upwardly step by step the distance between printed lines in said book, means for releasably retaining said slide in adjusted position with a printed line in alignment with said hood, means on said frame for engaging said housing to maintain said housing in spaced substantially parallel relation to said slide and a light source for illuminating the open face of said book whereby upon rotation of said disk a line of printing on one page of said book will be progressively visible in a series of exposures through said apertures from left to right, each exposure being of the same duration, and upon completion of one page, said carriage may be moved on said base to bring the opposite page into alignment with said hood, said arcuate slots serving to fix the eyes of the viewer at the center of each aperture.

5. Remedial reading apparatus comprising a base, a housing extending above said base and hingedly mounted thereon, said housing including a front wall and a partial rear wall closing the lower part of said housing, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a predetermined speed, a carriage mounted on said base rearwardly of said housing for movement longitudinally of said base, a book supporting frame mounted on said carriage, a vertically movable slide mounted on said frame, means for retaining an open book on said slide, means for moving said slide upwardly step by step the distance between printed lines in said book, means for releasably retaining said slide in adjusted position with a printed line in alignment with said hood, means on said frame for engaging said housing to maintain said housing in spaced substantially parallel relation to said slide and a light source for illuminating the open face of said book whereby upon rotation of said disk a line of printing on one page of said book will be progressively visible in a series of exposures through said apertures from left to right, each exposure being of the same duration, and upon completion of one page said carriage may be moved on said base to bring the opposite page into alignment with said hood, said arcuate slots serving to fix the eyes of the viewer at the center of each aperture.

6. Remedial reading apparatus comprising a base, a housing extending above said base and hingedly mounted thereon, said housing including a front wall, a disk rotatably mounted on said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a pre-determined speed, a carriage mounted on said base rearwardly of said housing for movement longitudinally of said base, a book supporting frame mounted on said carriage, a vertically movable slide mounted on said frame, means for retaining an open book on said slide, means for moving said slide upwardly step by step the distance between printed lines in said book, means for releasably retaining said slide in adjusted position with a printed line in alignment with said hood and means on said frame for engaging said housing to maintain said housing in spaced substantially parallel relation to said slide whereby upon rotation of said disk a line of printing on one page of said book will be progressively visible in a series of exposures through said apertures from left to right, each exposure being of the same duration, and upon completion of one page, said carriage may be moved on said base to bring the opposite page into alignment with said hood, said arcuate slots serving to fix the eyes of the viewer at the center of each aperture.

7. Remedial reading apparatus comprising a base, a housing extending above said base and mounted thereon, said housing including a front wall, a disk rotatably mounted on said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a pre-determined speed, a carriage mounted on said base rearwardly of said housing for movement longitudinally of said base, a book supporting frame mounted on said carriage, a vertically movable slide mounted on said frame, means for retaining an open book on said slide and means for moving said slide upwardly, step by step, the distance between printed lines in said book whereby upon rotation of said disk a line of printing on one page of said book will be progressively visible in a series of exposures through said apertures from left to right, each exposure being the same duration, and upon completion of one page said carriage may be moved on said base to bring the opposite page into alignment with said hood, said arcuate slots serving to fix the eyes of the viewer at the center of each aperture.

8. Remedial reading apparatus comprising a base, a housing extending above said base and mounted thereon, said housing including a front wall, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a predetermined speed, a book supporting frame mounted on said base rearwardly of said housing, a vertically movable slide mounted on said frame, means for retaining an open book on said slide and means for moving said slide upwardly step by step the distance between printed lines on said book whereby upon rotation of said disk a line of printing on one page of said book will be progressively visible in a series of exposures through said apertures from left to right, each exposure being of the same duration, said arcuate slots serving to fix the eyes of the viewer at the center of each aperture.

9. Remedial reading apparatus comprising a base, a housing extending above said base and mounted thereon, said housing including a front wall, a disk rotatably mounted in said housing, a first aperture of trapezoidal shape in said disk with the major dimension disposed on a radius, a first arcuate slot in said disk terminating in said first aperture at the transverse center line, a second aperture of trapezoidal shape in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third aperture of trapezoidal shape in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth aperture of trapezoidal shape in said disk with the major dimension disposed on a radius angularly spaced 90 degrees from said third mentioned radius and with the outer edge in alignment with the inner edge of said third aperture, a fourth arcuate slot in said disk terminating in said fourth aperture at the transverse center line, a viewing hood extending through said front wall on a radius of said disk, means for rotating said disk at a predetermined speed, a book supporting frame mounted on said base rearwardly of said housing, means for retaining an open book on said frame and means for moving said book upwardly step by step the distance between printed lines therein whereby upon rotation of said disk a line of printing on one page of said book will be progressively visible in a series of exposures through said apertures from left to right, each exposure being of the same duration, said arcuate slots serving to fix the eyes of the viewer at the center of each aperture.

10. Remedial reading apparatus comprising a base, a housing extending above said base and mounted thereon, said housing including a front wall, a disk rotatably mounted in said housing, a first elongated aperture in said disk with the major dimension disposed on a radius, a first arcuate slot in said disk terminating in said first aperture at the transverse center line, a second elongated aperture in said disk with the major dimension disposed on a radius angularly spaced 90 degrees from said first mentioned radius and with the outer edge in arcuate alignment with the inner edge of said first aperture, a second arcuate slot in said disk terminating in said second aperture at the transverse center line, a third elongated aperture in said disk with the major dimension disposed on a radius angularly spaced 90 degrees from said second mentioned radius and with the outer edge in arcuate alignment with the inner edge of said second aperture, a third arcuate slot in said disk terminating in said third aperture at the transverse center line, a fourth elongated aperture in said disk with the major dimension disposed on a radius angularly spaced 90 degrees from said third mentioned radius and with the outer edge in arcuate alignment with the inner edge of said third aperture, a fourth arcuate slot in said disk terminating in said fourth aperture at the transverse center line, a viewing hood extending through said front wall on a radius of said disk, means for rotating said disk at a predetermined speed, a book supporting frame mounted on said base rearwardly of said housing, means for retaining an open book on said frame and means for moving said book upwardly step by step the distance between printed lines therein whereby upon rotation of said disk a line of printing on one page of said book will be progressively visible in a series of exposures through said apertures from left to right, each exposure being of the same duration, said arcuate slots serving to fix the eyes of the viewer at the center of each aperture.

11. Remedial reading apparatus comprising a base, a housing extending above said base and mounted thereon, said housing including a front wall, a disk rotatably mounted in said housing, a first elongated aperture in said disk with the major dimension disposed on a radius, a first arcuate slot in said disk terminating in said first aperture at the transverse center line, a second elongated aperture in said disk with the major dimension disposed on a radius angularly spaced 120 degrees from said first mentioned radius and with the outer edge in arcuate alignment with the inner edge of said first aperture, a second arcuate slot in said disk terminating in said second aperture at the transverse center line, a third elongated aperture in said disk with the major dimension disposed on a radius angularly spaced 120 degrees from said second mentioned radius and with the outer edge in arcuate alignment with the inner edge of said second aperture, a third arcuate slot in said disk terminating in said third aperture at the transverse center line, a viewing hood extending through said front wall on a radius of said disk, means for rotating said disk at a predetermined speed, a book supporting frame mounted on said base rearwardly of said housing, means for retaining an open book on said frame and means for moving said book upwardly step by step the distance between printed lines therein whereby upon rotation of said disk, a line of printing on one page of said book will be progressively visible in a series of exposures through said apertures from left to right, each exposure being of the same duration, said arcuate slots serving to fix the eyes of the viewer at the center of each aperture.

12. Remedial reading apparatus comprising a base, a housing extending above said base and mounted thereon, said housing including a front wall, a disk rotatably mounted in said housing, a first elongated aperture in said disk with the major dimension disposed on a radius, a first arcuate slot in said disk terminating in said first aperture at the transverse center line, a second elongated aperture in said disk with the major dimension disposed on a radius angularly spaced 180 degrees from said first mentioned radius and with the outer edge in arcuate alignment with the inner edge of said first aperture, a second arcuate slot in said disk terminating in said second aperture at the transverse center line, a viewing hood extending through said front wall on a radius of said disk, means for rotating said disk at a predetermined speed, a book supporting frame mounted on said base rearwardly of said housing, means for retaining an open book on said frame and means for moving said book upwardly step by step the distance between printed lines therein whereby upon rotation of said disk a line of printing on one page of said book will be progressively visible in a series of exposures through said apertures from left to right, each exposure being of the same duration, said arcuate slots serving to fix the eyes of the viewer at the center of each aperture.

13. Remedial reading apparatus comprising a base, a housing extending above said base and mounted thereon, said housing including a front wall, a disk rotatably mounted in said housing, a first elongated aperture in said disk with the major dimension disposed on a radius, a second elongated aperture in said disk with the major dimension disposed on a radius angularly spaced 180 degrees from said first mentioned radius and with the outer edge in arcuate alignment with the inner edge of said first aperture, a viewing hood extending through said front wall on a radius of said disk, means for rotating said disk at a predetermined speed, a book supporting frame mounted on said base rearwardly of said housing, means for retaining an open book on said frame and means for moving said book upwardly step by step the distance between printed lines therein whereby upon rotation of said disk a line of printing on one page of said book will be progressively visible in a series of exposures through said apertures from left to right, each exposure being of the same duration.

14. Remedial reading apparatus comprising a base, a housing extending above said base and mounted thereon, said housing including a front wall, a disk rotatably mounted in said housing, a first elongated aperture in said disk with the major dimension disposed on a radius, a second elongated aperture in said disk with the major dimension disposed on a radius angularly spaced 180 degrees from said first mentioned radius and with the outer edge in arcuate alignment with the inner edge of said first aperture, a viewing hood extending through said front wall on a radius of said front disk, means for rotating said disk at a predetermined speed, a book supporting frame mounted on said base rearwardly of said housing and means for retaining an open book on said frame whereby upon rotation of said disk a line of printing on one page of said book will be progressively visible in a series of exposures through said apertures from left to right, each exposure being of the same duration.

15. Remedial reading apparatus comprising a base, a housing extending above said base and mounted thereon, said housing including a front wall, a disk rotatably mounted in said housing, a plurality of elongated apertures in said disk, a viewing hood extending through said front wall, means for rotating said disk at a predetermined speed, a book supporting frame mounted on said base rearwardly of said housing and means for retaining an open book on said frame whereby upon rotation of said disk a line of printing on one page of said book will be progressively visible in a series of exposures through said apertures from left to right, each exposure being of the same duration.

16. Remedial reading apparatus comprising a base, a housing extending above said base and mounted thereon, said housing including a front wall, a disk rotatably mounted in said housing, a plurality of apertures in said disk, an elongated viewing opening in said front wall on a radius of said disk, means for rotating said disk at a predetermined speed, a book supporting frame mounted on said base rearwardly of said housing and means for retaining an open book on said frame whereby upon rotation of said disk a line of printing on one page of said book will be progressively visible in a series of exposures through said apertures from left to right, each exposure being of the same duration.

17. For use in a remedial reading apparatus of a character described, a rotatable disk, a first elongated aperture of trapezoidal shape in said disk with the major dimension disposed on a radius, three spaced arcuate slots in said disk and terminating in said first aperture, the length of each slot being substantially three times the width of said first aperture at the point of termination, a shutter for said first aperture comprising a curtain of elastic material having one end secured to said disk adjacent the inner end of said aperture, snap means for releasably securing the opposite end of said curtain at spaced points along the length of said aperture and a second curtain of elastic material having one end secured to said disk adjacent the outer end of said aperture, snap means for releasably securing the opposite end of said second curtain at spaced points along the length of said aperture, a shutter for said arcuate slots comprising a curtain of elastic material having one end secured to said disk adjacent the inner side of the inner slot, snap means for securing the opposite end of said last named curtain in position to selectively cover either the inner or the inner and center slots and a second curtain of elastic material having one end secured to said disk adjacent the outer side of the outer slot, snap means for securing the opposite end of said last named curtain in position to cover or uncover the outer slot, a second elongated aperture of trapezoidal shape in said disk with the major dimension disposed on a radius angularly spaced 90 degrees from said first mentioned radius, the length of said second aperture being approximately one-quarter of the length of said first aperture and being spaced radially inwardly from the outer end of said first aperture a distance approximately equal to one-quarter the length of said first aperture, an arcuate slot in said disk terminating in said second aperture at the transverse center line, the length of said last named slot being approximately three times the width of said second aperture at the transverse center line, a shutter for said second aperture and slot comprising a curtain of elastic material having one end secured to said disk adjacent the outer end of said second aperture and snap means for releasably securing the opposite end of said last named curtain in position to cover or uncover said second aperture and slot, a third elongated aperture of trapezoidal shape in said disk with the major dimension disposed on said second mentioned radius, the length of said third aperture being approximately one-third the length of said first aperture with the inner end of said third aperture at substantially arcuate alignment with the inner end of said first aperture, an arcuate slot in said disk terminating in said third aperture at the transverse center line, the length of said last named slot being approximately three times the width of said third aperture at the transverse center line, a shutter for said third aperture and slot comprising a curtain of elastic material having one end secured to said disk adjacent the inner end of said third aperture and snap means for releasably securing the opposite end of said last named curtain in position to cover or uncover said third aperture and slot, a fourth elongated aperture of trapezoidal shape in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, the length of each slot being substantially three times the width of said fourth aperture at the point of termination, a shutter for said fourth aperture and slot comprising a curtain of elastic material having one end secured to said disk adjacent the outer end of said fourth aperture, snap means for releasably securing the opposite end of said last named curtain in position to cover or uncover a portion of said fourth aperture and the inner one of said slots, a fifth elongated aperture of trapezoidal shape in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, the length of said last named slot being approximately three times the width of said fifth aperture at the transverse center line, a shutter for said fifth aperture and slot comprising a curtain of elastic material having one end secured to said disk adjacent the inner end of said fifth aperture and snap means for releasably securing the opposite end of said last named curtain in position to cover or uncover said fifth aperture and slot and a sixth elongated aperture of trapezoidal shape in said disk with the major dimension disposed on said fourth radius, the length of said sixth aperture being approximately one-fourth the length of said first aperture with the inner end of said sixth aperture in substantially arcuate alignment with the inner end of said first aperture, an arcuate slot in said disk terminating in said sixth aperture at the transverse line, the length of said last named slot being approximately three times the width of said sixth aperture at the transverse center line, a shutter for said sixth aperture and slot comprising a curtain of elastic material having one end secured to said disk adjacent the inner end of said sixth aperture and snap means for releasably securing the opposite end of said last named curtain in position to cover or uncover said sixth aperture and slot whereby upon adjustment of said shutters any desired combination of apertures and slots may be utilized to provide from one to four fixations per line of reading.

18. An apparatus as defined in claim 17, in which each shutter comprises an extensible and retractable curtain wound on a roll mounted on said disk, means associated with said roll to retract said curtain and means on the free end of said curtain to secure the same in adjusted position.

19. For use in a remedial reading apparatus of the character described, a rotatable disk, a first elongated aperture of trapezoidal shape in said disk with the major dimension disposed on a radius, three spaced arcuate slots in said disk and terminating in said first aperture, the length of each slot being substantially three times the width of said first aperture at the point of termination, a shutter for said first aperture comprising a curtain of elastic material having one end secured to said disk adjacent the inner end of said aperture, means for releasably securing the opposite end of said curtain at spaced points along the length of said aperture and a second curtain of elastic material having one end secured to said disk adjacent the outer end of said aperture, means for releasably securing the opposite ends of said second curtain at spaced points along the length of said aperture, a shutter for said arcuate slots comprising a curtain of elastic material having one end secured to said disk adjacent the inner side of the inner slot, means for securing the opposite end of said last named curtain in position to selectively cover either the inner or the inner and center slots and a second curtain of elastic material having one end secured to said disk adjacent the outer side of the outer slot, means for securing the opposite end of said last named curtain in position to cover or uncover the outer slot, a second elongated aperture of trapezoidal shape in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, an arcuate slot in said disk terminating in said second aperture at the transverse center line, the length of said last named slot being approximately three times the width of said second aperture at the transverse center line, a shutter for said second aperture and slot comprising a curtain of elastic material having one end secured to said disk adjacent the outer end of said second aperture and means for releasably securing the opposite end of said last named curtain in position to cover or uncover said second aperture and slot, a third elongated aperture of trapezoidal shape in said disk with the major dimension disposed on said second mentioned radius, the length of said third aperture being approximately one-third the length of said first aperture with the inner end of said third aperture in substantially arcuate alignment with the inner end of said first aperture, an arcuate slot in said disk terminating in said third aperture at the transverse center line, the length of said last named slot being approximately three times the width of said third aperture at the transverse center line, a shutter for said third aperture and slot comprising a curtain of elastic material having one end secured to said disk adjacent the inner end of said third aperture and means for releasably securing the opposite end of said last named curtain in position to cover or uncover said third aperture and slot, a fourth elongated aperture of trapezoidal shape in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, the length of each slot being substantially three times the width of said fourth aperture at the point of termination, a shutter for said fourth aperture and slots comprising a curtain of elastic material having one end secured to said disk adjacent the outer end of said fourth aperture, means for releasably securing the opposite end of said last named curtain in position to cover or uncover a portion of said fourth aperture and the outer one of said slots and a second curtain of elastic material having one end secured to said disk adjacent the inner end of said fourth aperture, means for releasably securing the opposite end of said last named curtain in position to cover or uncover a portion of said fourth aperture and the inner one of said slots, a fifth elongated aperture of trapezoidal shape in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, the length of said last named slot being approximately three times the width of said fifth aperture at the transverse center line, a shutter for said fifth aperture and slot comprising a curtain of elastic material having one end secured to said disk adjacent the inner end of said fifth aperture and means for releasably securing the opposite end of said last named curtain in position to cover or uncover said fifth aperture and slot and a sixth elongated aperture of trapezoidal shape in said disk with the major dimension disposed on said fourth mentioned radius, the length of said sixth aperture being approximately one-fourth the length of said first aperture with the inner end of said sixth aperture in substantially arcuate alignment with the inner end of said first aperture, an arcuate slot in said disk terminating in said sixth aperture at the transverse center line, the length of said last named slot being approximately three times the width of said sixth aperture at the transverse center line, a shutter for said sixth aperture and slot comprising a curtain of elastic material having one end secured to said disk adjacent the inner end of said sixth aperture and means for releasably securing the opposite end of said last named curtain in position to cover or uncover said sixth aperture and slot whereby upon adjustment of said shutters any desired combination of apertures and slots may be utilized to provide from one to four fixations per line of reading.

20. For use in a remedial reading apparatus of the character described, a rotatable disk, a first elongated aperture of trapezoidal shape in said disk with the major dimension disposed on a radius, three spaced arcuate slots in said disk and terminating in said first aperture, a shutter for said first aperture comprising a curtain of elastic material having one end secured to said disk adjacent the inner end of said aperture, means for releasably securing the opposite end of said curtain at spaced points along the length of said aperture and a second curtain of elastic material having one end secured to said disk adjacent the outer end of said aperture, means for releasably securing the opposite end of said second curtain at spaced points along the length of said aperture, a shutter for said arcuate slots comprising a curtain of elastic material having one end secured to said disk adjacent the inner side of the inner slot, means for securing the opposite end of said last named curtain in position to selectively cover either the inner or the inner and center slots and a second curtain of elastic material having one end secured to said disk adjacent the outer side of the outer slot, means for securing the opposite end of said last named curtain in position to cover or uncover the outer slot, a second elongated aperture of trapezoidal shape in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, an arcuate slot in said disk terminating in said second aperture at the transverse center line, a shutter for said second aperture and slot comprising a curtain of elastic material having one end secured to said disk adjacent the outer end of said second aperture and means for releasably securing the opposite end of said last named curtain in position to cover or uncover said second aperture and slot, a third elongated aperture of trapezoidal shape in said disk with the major dimension disposed on said second mentioned radius, the length of said third aperture being approximately one-third the length of said first aperture with the inner end of said third aperture in substantially arcuate alignment with the inner end of said first aperture, an arcuate slot in said disk terminating in said third aperture at the transverse center line, a shutter for said third aperture and slot comprising a curtain of elastic material having one end secured to said disk adjacent the inner end of said third aperture and means for releasably securing the opposite end of said last named curtain in position to cover or uncover said third aperture and slot, a fourth elongated aperture of trapezoidal shape in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, a shutter for said fourth aperture and slots comprising a curtain of elastic material having one end secured to said disk adjacent the outer end of said fourth aperture, means for releasably securing the opposite end of said last named curtain in position to cover or uncover a portion of said fourth aperture and the outer one of said slots and a second curtain of elastic material having one end secured to said disk adjacent the inner end of said fourth aperture, means for releasably securing the opposite ends of said last named curtain in position to cover or uncover a portion of said fourth aperture and the inner one of said slots, a fifth elongated aperture of trapezoidal shape in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, a shutter for said fifth apeture and slot comprising a curtain of elastic material having one end secured to said disk adjacent the inner end of said fifth aperture and means for releasably securing the opposite end of said last named curtain in position to cover or uncover said fifth aperture and slot and a sixth elongated aperture of trapezoidal shape in said disk with the major dimension disposed on said fourth mentioned radius, the length of said sixth aperture being approximately one-fourth the length of said first aperture with the inner end of said sixth aperture in substantially arcuate alignment with the inner end of said first aperture, an arcuate slot in said disk terminating in said sixth aperture at the transverse center line, a shutter for said sixth aperture and slot comprising a curtain of elastic material having one end secured to said disk adjacent the inner end of said sixth aperture and means for releasably securing the opposite end of said last named curtain in position to cover or uncover said sixth aperture and slot whereby upon adjustment of said shutters any desired combinations of apertures and slots may be utilized to provide from one to four fixations per line of reading.

21. For use in a remedial reading apparatus of the character described, a rotatable disk, a first elongated aperture in said disk with the major dimension disposed on a radius, three spaced arcuate slots in said disk and terminating in said first aperture, a shutter for said first aperture comprising a curtain of elastic material having one end secured to said disk adjacent the inner end of said aperture, means for releasably securing the opposite end of said curtain at spaced points along the length of said aperture and a second curtain of elastic material having one end secured to said disk adjacent the outer end of said aperture, means for releasably securing the opposite end of said second curtain at spaced points along the length of said aperture, a shutter for said arcuate slots comprising a curtain of elastic material having one end secured to said disk adjacent the inner side of the inner slot, means for securing the opposite end of said last named curtain in position to selectively cover either the inner or the inner and center slots and a second curtain of elastic material having one end secured to said disk adjacent the outer side of the outer slot, means for securing the opposite end of said last named curtain in position to cover or uncover the outer slot, a second elongated aperture in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, an arcuate slot in said disk terminating in said second aperture in the transverse center line, a shutter for said second aperture and slot comprising a curtain of elastic material having one end secured to said disk adjacent the outer end of said aperture and means for releasably securing the opposite end of said last named curtain in position to cover or uncover said second aperture and slot, a third elongated aperture in said disk with the major dimension disposed on said second mentioned radius, the length of said third aperture being approximately one-third the length of said first aperture with the inner end of said third aperture in substantially arcuate alignment with the inner end of said first aperture, an arcuate slot in said disk terminating in said third aperture at the transverse center line, a shutter for said third aperture and slot comprising a curtain of elastic material having one end secured to said disk adjacent the inner end of said third aperture and means for releasably securing the opposite end of said last named curtain in position to cover or uncover said third aperture and slot, a fourth elongated aperture in said disk with the major dimension disposed on a radius and angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, a shutter for said fourth aperture and slots comprising a curtain of elastic material having one end secured to said disk adjacent the outer end of said fourth aperture, means for releasably securing the opposite end of said last named curtain in position to cover or uncover a portion of said fourth aperture and the outer one of said slots and a second curtain of elastic material having one end secured to said disk adjacent the inner end of said fourth aperture, means for releasably securing the opposite end of said last named curtain in position to cover or uncover a portion of said fourth aperture and the inner one of said slots, a fifth elongated aperture in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, a shutter for said fifth aperture and slot comprising a curtain of elastic material having one end secured to said disk adjacent the inner end of said fifth aperture and means for releasably securing the opposite end of said last named curtain in position to cover or uncover said fifth aperture and slot and a sixth elongated aperture in said disk with the major dimension disposed on said fourth mentioned radius, the length of said sixth aperture being approximately one-fourth the length of said first aperture with the inner end of said sixth aperture in substantially arcuate alignment with the inner end of said first aperture, an arcuate slot in said disk terminating in said sixth aperture at transverse center line, a shutter for said sixth aperture and slot comprising a curtain of elastic material having one end secured to said disk adjacent the inner end of said sixth aperture and means for releasably securing the opposite end of said last named curtain in position to cover or uncover said sixth aperture and slot whereby upon adjustment of said shutters, any desired combination of apertures and slots may be utilized to provide from one to four fixations per line of reading.

22. For use in a remedial reading apparatus of the character described, a rotatable disk, a first elongated aperture in said disk with the major dimension disposed on a radius, three spaced arcuate slots in said disk and terminating in said first aperture, a shutter for said first aperture comprising a curtain having one end secured to said disk adjacent the inner end of said aperture, means for releasably securing the opposite end of said curtain at spaced points along the length of said aperture and a second curtain having one end secured to said disk adjacent the outer end of said aperture, means for releasably securing the opposite end of said second curtain at spaced points along the length of said aperture, a shutter for said arcuate slots comprising a curtain having one end secured to said disk adjacent the inner side of the inner slot, means for securing the opposite end of said last named curtain in position to selectively cover either the inner or the inner and center slots and a second curtain having one end secured to said disk adjacent the outer side of the outer slot, means for securing the opposite end of said last named curtain in position to cover or uncover the outer slot, a second elongated aperture in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, an arcuate slot in said disk terminating in said second aperture at the transverse center line, a shutter for said second aperture and slot comprising a curtain having one end secured to said disk adjacent the outer end of said second aperture and means for releasably securing the opposite end of said last named curtain in position to cover or uncover said second aperture and slot, a third elongated aperture in said disk with the major dimension disposed on said second mentioned radius, the length of said third aperture being approximately one-third the length of said first aperture with the inner end of said third aperture in substantially arcuate alignment with the inner end of said first aperture, an arcuate slot in said disk terminating in said third aperture at the transverse center line, a shutter for said third aperture and slot comprising a curtain having one end secured to said disk adjacent the inner end of said third aperture and means for releasably securing the opposite end of said last named curtain in position to cover or uncover said third aperture and slot, a fourth elongated aperture in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, a shutter for said fourth aperture and slots comprising a curtain having one end secured to said disk adjacent the outer end of said fourth aperture, means for releasably securing the opposite end of said last named curtain in position to cover or uncover a portion of said fourth aperture and the outer one of said slots and a second curtain having one end secured to said disk adjacent the inner end of said fourth aperture, means for releasably securing the opposite end of said last named curtain in position to cover or uncover a portion of said fourth aperture and the inner one of said slots, a fifth elongated aperture in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, a shutter for said fifth aperture and slot comprising a curtain having one end secured to said disk adjacent the inner end of said fifth aperture and means for releasably securing the opposite end of said last named curtain in position to cover or uncover said fifth aperture and slot and a sixth elongated aperture in said disk with the major dimension disposed on said fourth mentioned radius, the length of said sixth aperture being approximately one-fourth the length of said first aperture with the inner end of said sixth aperture in substantially arcuate alignment with the inner end of said first aperture, an arcuate slot in said disk terminating in said sixth aperture at the transverse center line, a shutter for said sixth aperture and slot comprising a curtain having one end secured to said disk adjacent the inner end of said sixth aperture and means for releasably securing the opposite end of said last named curtain in position to cover or uncover said sixth aperture and slot whereby upon adjustment of said shutters, any desired combination of apertures and slots may be utilized to provide from one to four fixations per line of reading.

23. An apparatus as defined in claim 22, in which each shutter comprises an extensible and retractable curtain wound on a roll mounted on said disk, means associated with said roll to retract said curtain and means on the free end of said curtain to secure the same in adjusted position.

24. For use in a remedial reading apparatus of the character described, a rotatable disk, a first elongated aperture in said disk with the major dimension disposed on a radius, three spaced arcuate slots in said disk and terminating in said first aperture, a shutter for said first aperture comprising means to selectively cover and uncover a portion of said aperture, a shutter for said arcuate slots comprising means to selectively cover said slots, a second elongated aperture in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, an arcute slot in said disk terminating in said second aperture at the transverse center line, a shutter for said second aperture and slot comprising means to cover or uncover said second aperture and slot, a third elongated aperture in said disk with the major dimension disposed on said second mentioned radius, the length of said third aperture being approximately one-third the length of said first aperture with the inner end of said third aperture in substantially arcuate alignment with the inner end of said first aperture, an arcuate slot in said disk terminating in said third aperture at the transverse center line, a shutter for said third aperture and slot comprising means to cover and uncover said third aperture and slot, a fourth elongated aperture in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, two spaced arcuate slots in said disk terminating in said fourth aperture, a shutter for said fourth aperture and slots comprising means to cover or uncover a portion of said fourth aperture and one or the other of said slots, a fifth elongated aperture in said disk with the major dimension disposed on a radius angularly spaced 90 degrees from said third mentioned radius, the length of said fifth aperture being approximately one-third the length of said first aperture with the outer end of said fifth aperture in substantially arcuate alignment with the outer end of said first aperture, an arcuate slot in said disk terminating in said fifth aperture at the transverse center line, a shutter for said fifth aperture and slot comprising means to cover or uncover said fifth aperture and slot and a sixth elongated aperture in said disk with the major dimension disposed on said fourth mentioned radius, the length of said sixth aperture being approximately one-fourth the length of said first aperture with the inner end of said sixth aperture in substantially arcuate alignment with the inner end of said first aperture, an arcuate slot in said disk terminating in said sixth aperture at the transverse center line, a shutter for said sixth aperture and slot comprising means to cover or uncover said sixth aperture and slot whereby upon adjustment of said shutters any desired combination of apertures and slots may be utilized to provide from one to four fixations per line of reading.

25. For use in a remedial reading apparatus of the character described, a rotatable disk, a first elongated aperture in said disk with the major dimension disposed on a radius, a shutter for said first aperture comprising means to selectively cover and uncover a portion of said aperture, a second elongated aperture in said disk with the major dimension disposed on a radius angularly spaced 90 degrees from said first mentioned radius, the length of said second aperture being approximately one-quarter the length of said first aperture and being spaced radially inwardly from the outer end of said first aperture a distance approximately equal to one-quarter the length of said first aperture, a shutter for said second aperture comprising means to cover or uncover said second aperture, a third elongated aperture in said disk with the major dimension disposed on said second mentioned radius, the length of said third aperture being approximately one-third the length of said first aperture with the inner end of said third aperture in substantially arcuate alignment with the inner end of said first aperture, a shutter for said third aperture comprising means to cover or uncover said third aperture, a fourth elongated aperture in said disk with the major dimension disposed on a radius angularly spaced 90 degrees from said second mentioned radius, the length of said third aperture being approximately two-thirds the length of said first aperture with the outer end of said fourth aperture in substantially arcuate alignment with the outer end of said first aperture, a shutter for said fourth aperture comprising means to cover or uncover a portion of said fourth aperture, a fifth elongated aperture in said disk with the major dimension disposed on a radius angularly spaced 90 degrees from said first mentioned radius, the length of said fifth aperture being approximately one-third the length of said first aperture with the outer end of said fifth aperture in substantially arcuate alignment with the outer end of said first aperture, a shutter for said fifth aperture comprising means to cover or uncover said fifth aperture and a sixth elongated aperture in said disk with the major dimension disposed on said fourth mentioned radius, the length of said sixth aperture being approximately one-fourth the length of said first aperture with the inner end of said sixth aperture in substantially arcuate alignment with the inner end of said first aperture, a shutter for said sixth aperture comprising means to cover or uncover said sixth aperture whereby upon adjustment of said shutters any desired combination of apertures may be utilized to provide from one to four fixations per line of reading.

26. An apparatus as defined in claim 25 in which each shutter comprises an extensible and retractable curtain wound on a roll mounted on said disk, means associated with said roll to retract said curtain and means on the free end of said curtain to secure the same in adjusted position.

References Cited in the file of this patent

UNITED STATES PATENTS

| | | |
|---|---|---|
| Re. 20,223 | Taylor | Dec. 29, 1936 |
| 1,879,501 | Rigler | Sept. 27, 1932 |
| 2,265,924 | Oerter et al. | Dec. 9, 1941 |
| 2,357,593 | Leavell | Sept. 5, 1944 |
| 2,432,123 | Potter | Dec. 9, 1947 |